United States Patent
Cho et al.

(10) Patent No.: US 12,081,911 B2
(45) Date of Patent: Sep. 3, 2024

(54) BURIED PERSON SEARCH DEVICE USING DETACHABLE MODULE

(71) Applicant: Republic of Korea (National Disaster Management Research Institute), Ulsan (KR)

(72) Inventors: Si Beum Cho, Ulsan (KR); Kyung Su Lee, Ulsan (KR); Jae Jeong Kim, Ulsan (KR); Cheol Kyu Lee, Ulsan (KR); Tae Wook Lee, Ulsan (KR)

(73) Assignee: Republic of Korea (National Disaster Management Research Institute), Ulsan (KR)

( * ) Notice: Subject to any disclaimer, the term of this patent is extended or adjusted under 35 U.S.C. 154(b) by 0 days.

(21) Appl. No.: 18/212,313

(22) Filed: Jun. 21, 2023

(65) Prior Publication Data
US 2024/0163401 A1     May 16, 2024

(30) Foreign Application Priority Data
Jun. 21, 2022 (KR) .......................... 10-2022-0075700

(51) Int. Cl.
*H04N 7/18* (2006.01)
*A63B 29/02* (2006.01)
(Continued)

(52) U.S. Cl.
CPC .......... *H04N 7/181* (2013.01); *A63B 29/021* (2013.01); *B64U 80/86* (2023.01); *G01J 5/0025* (2013.01);
(Continued)

(58) Field of Classification Search
CPC ...... H04N 7/181; A63B 29/021; B64U 80/86; B64U 2101/30; B64U 2101/56;
(Continued)

(56) References Cited

U.S. PATENT DOCUMENTS 4,138,077 A * 2/1979 Okumura .................. B63C 9/26
441/83
2009/0248202 A1* 10/2009 Osuka .................. A61H 1/0237
700/245
(Continued)

FOREIGN PATENT DOCUMENTS

JP      2001-179668 A      7/2001
KR      10-1309747 B1      10/2013
(Continued)

OTHER PUBLICATIONS

Kumar et al., A. Trapped Miners Detection, location and Communication, Google Scholar, Minetech, vol. 24, No. 6, Nov.-Dec. 2003, pp. 1-13 (Year: 2003).*
(Continued)

*Primary Examiner* — Russell Frejd
(74) *Attorney, Agent, or Firm* — Bridgeway IP Law Group, PLLC; Sang Ho Lee; Hyun Woo Shin

(57) ABSTRACT

A buried person search device using a detachable module is disclosed. The device includes a ground drone 10 deployed at a site of a collapse disaster, the ground drone 10 having a communication device 80 and a first beacon, a camera device 40 mounted on the ground drone 10 to photograph surroundings of the ground drone 10, a storage 50 installed on the ground drone 10, a plurality of repeater modules 60 connected by a wireless communication network to relay wireless communications between the ground drone 10, a flying drone 32, and a command and control center 100, each of the repeater modules 60 having a second beacon, and a sensing device 70 installed on the ground drone 10 or the repeater modules 60 to collect a sound, wherein the storage 50 accommodates the repeater modules 60, and throws the repeater modules 60 in response to an operation signal.

8 Claims, 4 Drawing Sheets

(51) Int. Cl.
*B64U 80/86* (2023.01)
*B64U 101/30* (2023.01)
*B64U 101/56* (2023.01)
*G01J 5/00* (2022.01)
*G01S 1/02* (2010.01)
*G05D 1/648* (2024.01)
*G05D 105/80* (2024.01)
*G05D 107/30* (2024.01)
*G06V 20/17* (2022.01)
*G06V 20/50* (2022.01)

(52) U.S. Cl.
CPC ................ *G01S 1/02* (2013.01); *G05D 1/648* (2024.01); *G06V 20/17* (2022.01); *G06V 20/50* (2022.01); *B64U 2101/30* (2023.01); *B64U 2101/56* (2023.01); *B64U 2201/20* (2023.01); *G05D 2105/87* (2024.01); *G05D 2107/36* (2024.01)

(58) Field of Classification Search
CPC ...... B64U 2201/20; G01J 5/0025; G01S 1/02; G05D 1/648; G05D 2105/87; G05D 2107/36; G06V 20/17; G06V 20/50
See application file for complete search history.

(56) References Cited

U.S. PATENT DOCUMENTS

| | | | | |
|---|---|---|---|---|
| 2015/0365808 | A1* | 12/2015 | Tseng | G01S 5/12 455/404.2 |
| 2022/0246016 | A1* | 8/2022 | Rosin | G08B 21/02 |
| 2023/0072985 | A1* | 3/2023 | Kan | G06N 3/006 |

FOREIGN PATENT DOCUMENTS

| | | |
|---|---|---|
| KR | 10-1709157 B1 | 2/2017 |
| KR | 10-1765074 B1 | 8/2017 |
| KR | 10-1842194 B1 | 3/2018 |
| KR | 10-1857566 B1 | 5/2018 |
| KR | 10-1914589 B1 | 12/2018 |
| KR | 10-2108286 B1 | 5/2020 |
| KR | 10-2318489 B1 | 10/2021 |
| KR | 10-2379303 B1 | 3/2022 |

OTHER PUBLICATIONS

Grazzini et al., G. An Ultra-Wideband High-Dynamic Range GPR for Detecting Buried People After Collapse of Buildings, Google Scholar, IEEE, Proceedings of the XIII International Conference on Ground Penetrating Radar, Jun. 2010, pp. 1-6. (Year: 2010).*

Blitch, J. Artificial Intelligence Technologies for Robot Assisted Urban Search and Rescue, Google Scholar, Pergamon, Elsevier Science, Expert Systems with Applications, vol. 11, No. 2, 1996, pp. 109-124. (Year: 1996).*

Youtube, NIA, National Information Society Agency, Understanding Disaster Safety Communication Network (Jan. 14, 2022), https://youtu.be/fK0jFfb5cQ0.

Youtube, NIA, National Information Society Agency, Understanding Standard Operating Procedures (Jan. 14, 2022), https://youtu.be/HhHTsU603JI.

* cited by examiner

BURIED PERSON SEARCH DEVICE USING DETACHABLE MODULE

CROSS REFERENCE TO RELATED APPLICATION(S)

This application claims priority to and the benefit of Korean Patent Application No. 2022-0075700, filed on Jun. 21, 2022, the disclosure of which is incorporated herein by reference in its entirety.

FIELD OF THE INVENTION

The present disclosure relates to a device for detecting distressed persons at a disaster site where a man-made structure has collapsed, and a method of operating the device, and more particularly, to a buried person search device using a detachable module.

DESCRIPTION OF THE RELATED ART

Typical man-made structures include houses, commercial buildings, office buildings, airports, bus terminals, factories, and construction sites. Man-made structures can collapse due to poor construction or unexpected collisions.

In the event of a collapse, firefighters or rescue teams are sent to the collapse area to determine whether it is safe to proceed with rescue operations, whether the structure is unstable, how unstable the structure is, and whether there is a possibility of further collapse.

Under normal circumstances, when no accident has occurred, the inside of a man-made structure may be well-lit and communications may be smooth.

In the event of an accident, emergency power can be supplied to man-made structures. However, in the event of a collapse, it may be difficult to supply emergency power. In some cases, water pipes or drainage pipes may have burst, and thus supplying emergency power in the presence of moisture may cause an electric shock. Therefore, it is necessary to be very cautious.

In addition, in the event of a collapse, a part of the ceiling or wall of the man-made structure may collapse, or various equipment or facilities placed inside the man-made structure may be arranged in a disorderly manner, which may hinder the passage of rescue teams or threaten safety.

In addition, there may be people inside the man-made structure who have not evacuated and are trapped or injured and are unable to move on their own. Such people may receive help from rescuers.

However, disorganized equipment and facilities can block the view of rescuers, making it very difficult for them to locate people in distress based on visual information alone.

At the site of a collapse disaster, it is not possible to know if anyone is in need of help, and if so, where they are, or if walking paths can be secured. Even if drawings of the structure are available, the collapsed structure may be different from the drawings. Because of these difficult environments and conditions, rescue operations should be conducted with extreme caution.

In addition, communication is difficult in collapsed man-made structures due to the loss of power supply. In particular, it is difficult to share on-site situation information in the deep interior of man-made structures due to the lack of communication signals, which makes it difficult to communicate between the command center and rescue teams.

Meanwhile, people who are affected by a disaster may be experiencing the disaster for the first time. Even if they have participated in disaster drills in the past, they may panic and not know how to deal with the disaster situation. They may not have any idea of how to communicate their location, and thus feel panic and fear.

Therefore, there is a need for a method to reassure those affected by the disaster by explaining what is happening and how to deal with it.

Also, all electronic devices used in a disaster are battery-powered, and are useless if the battery is dead. Therefore, there is a need for a method to deal with this issue.

SUMMARY OF THE DISCLOSURE

Technical Problem to be Solved

Therefore, the present disclosure has been made in view of the above problems, and it is an object of the present disclosure to provide a device for detecting a person in distress at a site of a collapse disaster which can more reliably identify whether there is a person in need of help, where the person in need of help is and what situation the person is facing, and a method for operating the device.

Technical Solution

In accordance with an aspect of the present disclosure, the above and other objects can be accomplished by the provision of a buried person search device using a detachable module, the device including a ground drone 10 deployed at a site of a collapse disaster to travel by driving a track device 20, the ground drone 10 having a communication device 80 and a first beacon mounted thereon, a camera device 40 mounted on the ground drone 10 to photograph surroundings on front, rear, left and right sides of the ground drone 10 and above the ground drone 10, a storage 50 installed on the ground drone 10, a plurality of repeater modules 60 connected by a wireless communication network to relay wireless communications between the ground drone 10, a flying drone 32, and a command and control center 100, each of the repeater modules having a second beacon 60, and a sensing device 70 installed on the ground drone 10 or the repeater modules 60 to collect a human breathing sound, a voice, a cell phone sound, and a man-made rhythmic sound, wherein the storage 50 accommodates the repeater modules 60, and throws the repeater modules 60 to the site of the collapse disaster in response to an operation signal.

In one embodiment, image data collected by the camera device 40 and image data collected by the flying drone 32 may be transmitted in real time to the command and control unit 100 over the wireless communication network, wherein control signals to control the ground drone 10 and the flying drone 32 may be transmitted in real time from the command and control unit 100.

In one embodiment, the camera device 40 may include a thermal imaging camera 42 configured to measure a temperature of a subject, a imaging camera 44 configured to capture a general image, and a light 45 configured to emit light to enhance image quality.

In one embodiment, the storage 50 may include a screw conveyor 52 configured in a helical shape to accommodate the repeater modules 60 in spaces provided in troughs of the screw conveyor 52, and a drain guide 54 disposed on one side of that screw conveyor 52 and extending inclined towards ground so as to lower an impact energy against the ground when any one of the repeater modules 60 falling out of the screw conveyor 52 hits the ground.

In one embodiment, when a rescue team approaches within a communication distance range, the first beacon or the second beacon may recognize a terminal carried by the rescue team and cause the terminal to indicate presence of the ground drone 10 or the repeater modules 60 near the rescue team.

In accordance with another aspect of the present disclosure, there is provided a method for operating a device for detecting a person in distress at a site of a collapse disaster, the method including a first step S1 of introducing a ground drone 10 to the site of the collapse disaster, moving the ground drone 10 to a communication shaded area and establishing the wireless communication network by throwing a repeater module, a second step S2 of stopping all devices generating noise from functioning among devices mounted on the ground drone 10, a third step S3 of repeating transmitting and stopping of transmission of a rescue announcement voice at regular time intervals, a fourth step S4 of receiving input voice data or image data when the transmission of the rescue announcement voice is stopped, a fifth step S5 of communicating collected voice data and collected image data and control signals for controlling the respective devices over the wireless communication network, a sixth step S6 of analyzing one of a human breathing sound, a voice, and a mobile terminal sound from the input voice data and determining a vital sign, and a seventh step S7 of, when a rescue team enters the site of the collapse disaster and approaches the ground drone 10 or the repeater module 60 that has sent a basis for determining a vital sign, recognizing, by a first beacon or a second beacon, a terminal carried by the rescue team, and causing the terminal to indicate presence of the ground drone 10 or a repeater module 60 near the rescue team.

In one embodiment, the fourth step may include requesting a specific rhythmic sound in the rescue announcement voice, wherein the sixth step may include determining whether the specific rhythmic sound is contained in the collected voice data by analyzing the collected voice data, and when the specific rhythmic sound is contained in the collected voice data, determining the rhythmic sound to be the vital sign.

Specific details of other embodiments are included in the detailed description and drawings.

Advantageous Effects

A device for detecting a person in distress at a site of a collapse disaster configured as described above may more reliably identify whether there is a person in need of help, where the person in need of help is and what situation the person is facing.

Further, a device for detecting a person in distress at a site of a collapse disaster device according to an embodiment of the present disclosure may carry a repeater module, throw the repeater module when it arrives at a shaded area where communication is not smooth, and establish a wireless communication network using the repeater modules thrown in different places.

In particular, the embodiment of the present disclosure may allow a wireless communication network to be established at the site of a collapse disaster when the connection to the disaster safety communication network and the commercial communication network is not smooth, thereby enabling more accurate acquisition and sharing of on-site situation information and contributing to the establishment and implementation of rescue plans in a safer manner.

DETAILED DESCRIPTION OF THE DISCLOSURE

Figure 1:
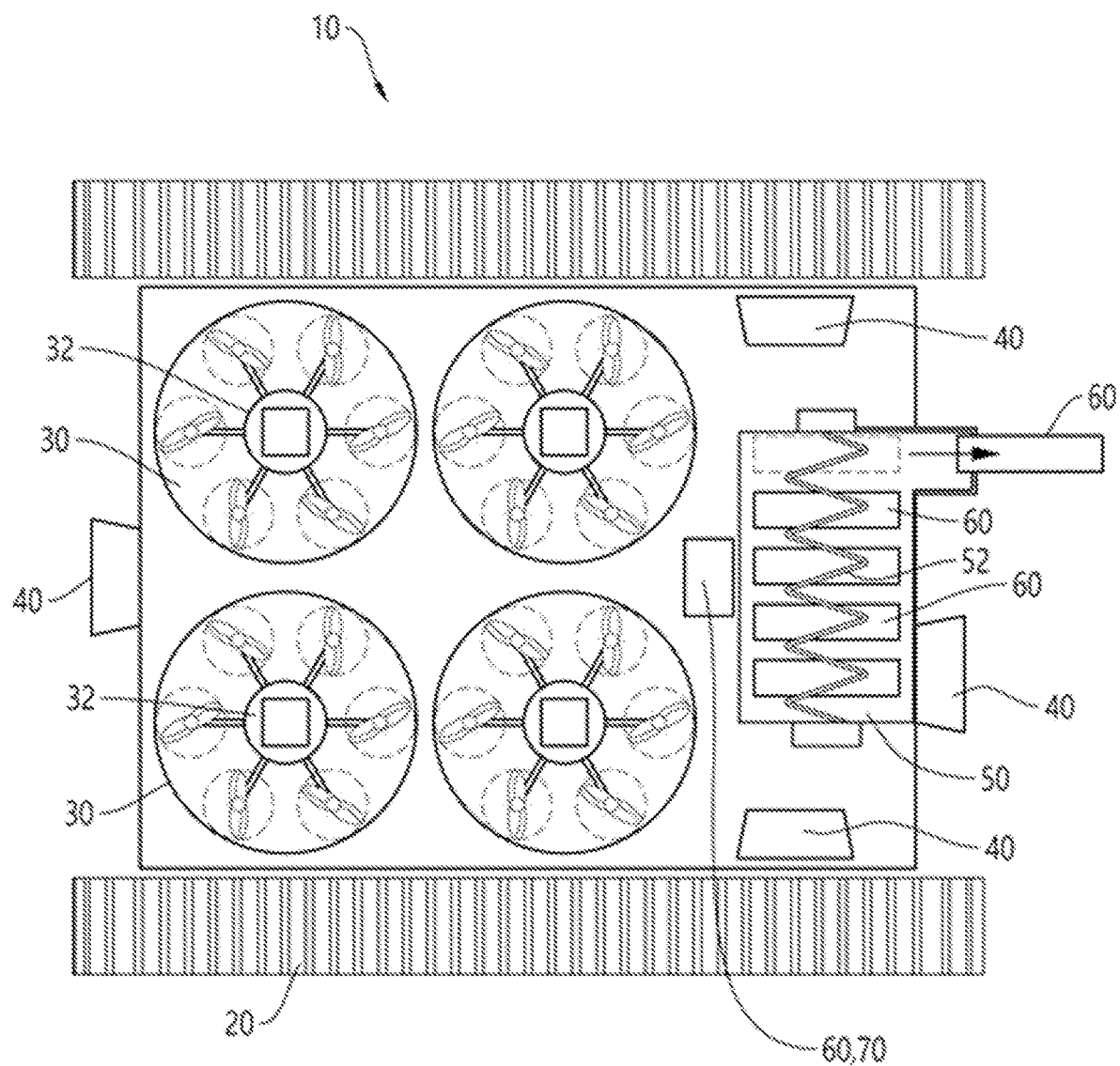
FIGS. 1 and 2 are a plan view and side view illustrating an exemplary device for detecting a person in distress at a site of a collapse disaster according to an embodiment of the present disclosure.

The advantages and features of the present disclosure, and methods of achieving them, will become apparent upon examination of the embodiments described below in detail with reference to the accompanying drawings.

Hereinafter, embodiments of the present disclosure will be described in detail with reference to the accompanying drawings. It is to be understood that the embodiments described herein are illustrated by way of example to provide a thorough understanding of the present disclosure, and that various modifications can be made to the disclosure. In describing the present disclosure, detailed descriptions and specific drawings of known functions or components may be omitted to avoid obscuring the subject matter of the disclosure. Also, for the sake of illustrating the disclosure, some components may not be drawn to scale and the sizes thereof may be exaggerated.

Terms such as first or second may be used to describe various components, but the components are not to be limited by such terms. These terms are used only to distinguish one component from another. For example, without departing from the scope of the present disclosure, a first component may be named as a second component, and similarly, a second component may be named as a first component.

Terms used in the following disclosure are defined in view of their functions in the present disclosure, which may vary according to the intentions of the producer or customs, and their definitions should be determined on the basis of the disclosure as a whole.

Throughout the specification, like reference numerals refer to like components.

Figure 2:
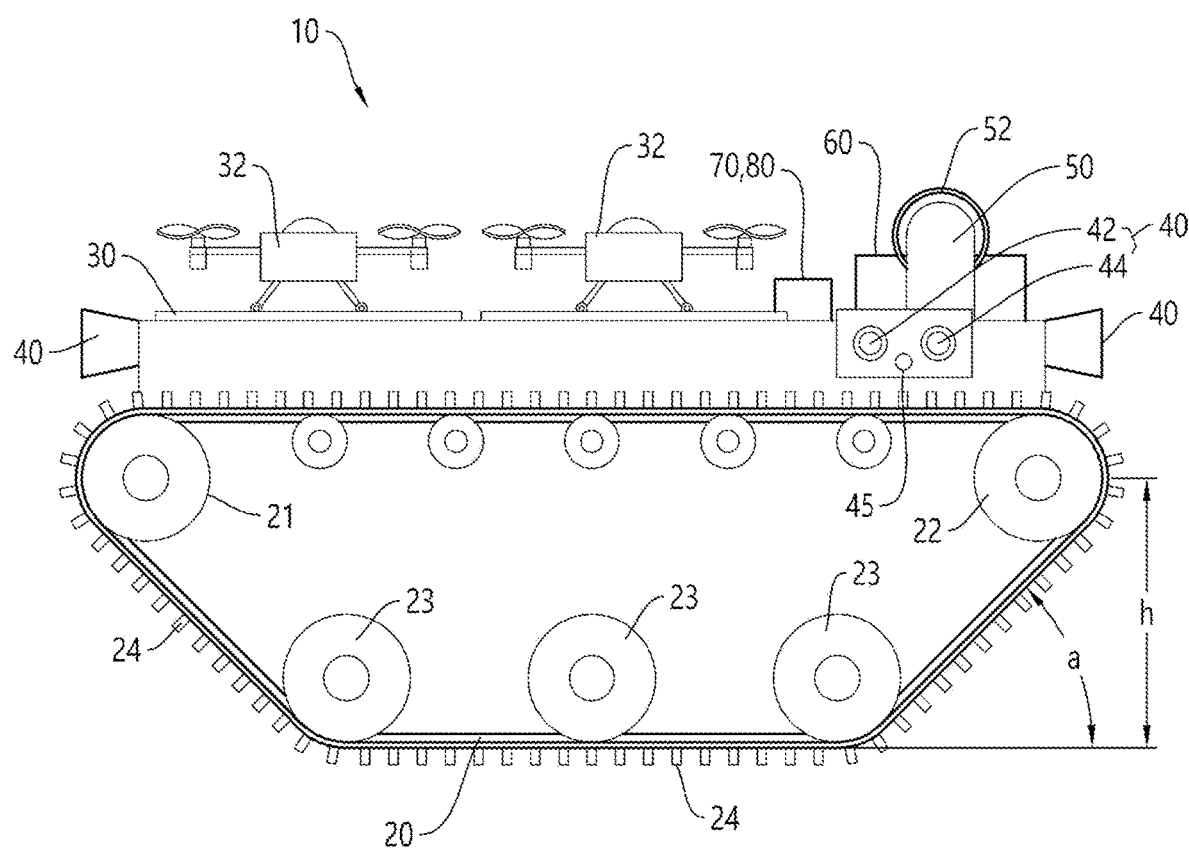
Figure 3:
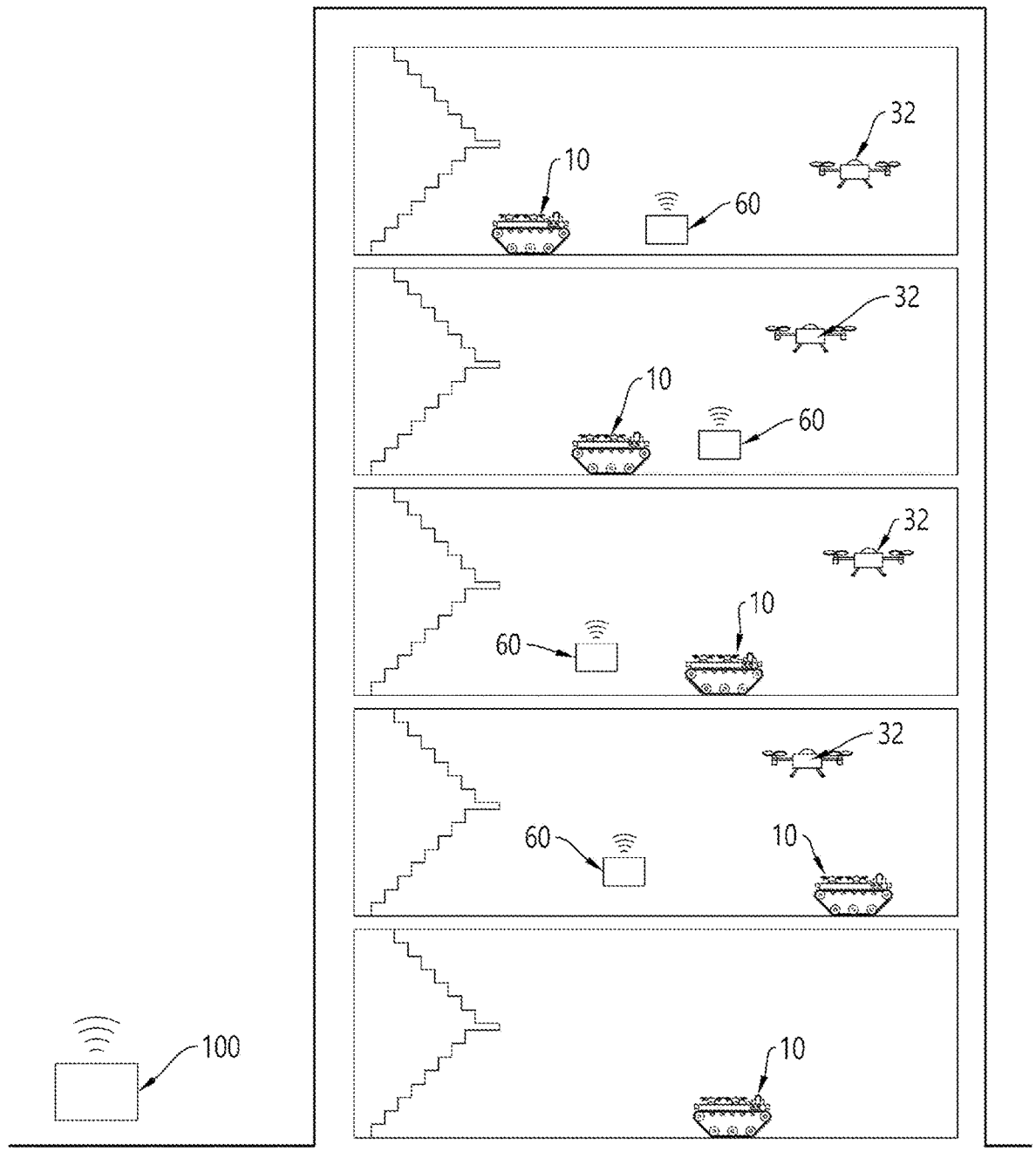
FIG. 3 is an example perspective view illustrating an operation effect of the device for detecting a person in distress at a site of a collapse disaster according to the embodiment of the present disclosure.
Figure 4:
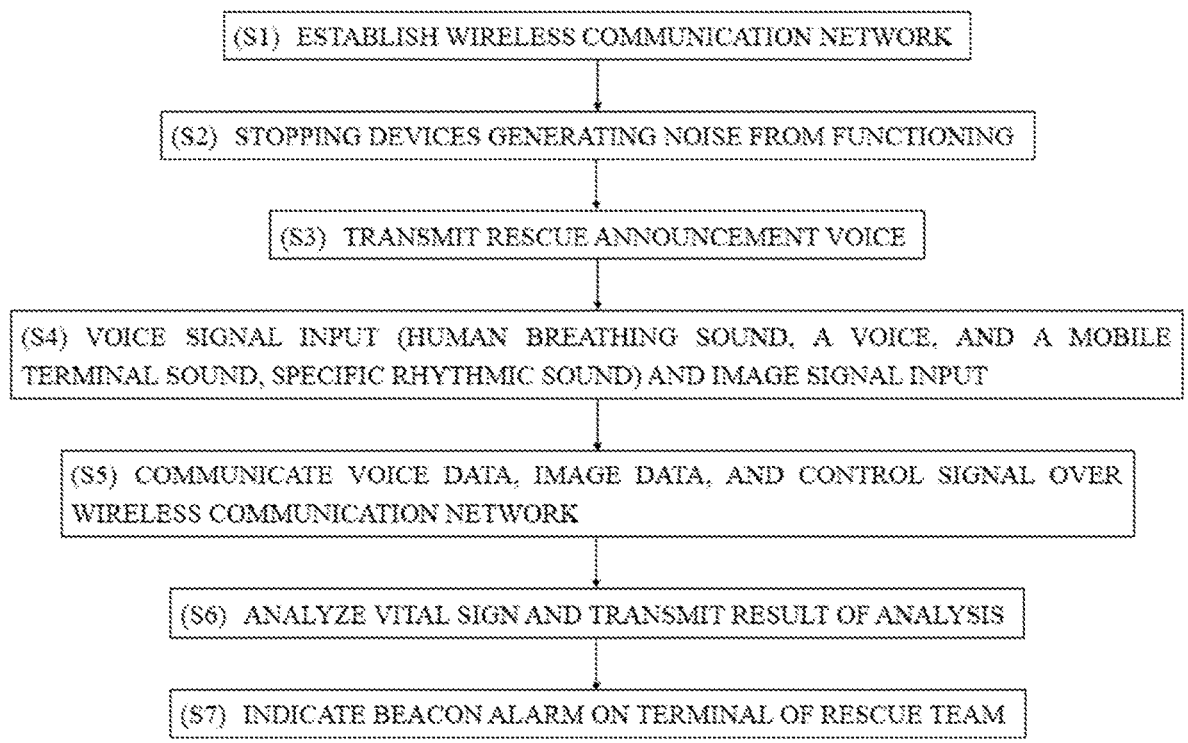
FIG. 4 is a flowchart illustrating an operation sequence of a device for detecting a person in distress at a site of a collapse disaster according to an embodiment of the present disclosure.

Hereinafter, a device for detecting a person in distress at a site of a collapse disaster according to an embodiment of the present disclosure will be described with reference to FIGS. 1 to 4. FIGS. 1 and 2 are a plan view and side view illustrating an exemplary device for detecting a person in distress at a site of a collapse disaster according to an embodiment of the present disclosure. FIG. 3 is an example perspective view illustrating an operation effect of the device for detecting a person in distress at a site of a collapse disaster according to the embodiment of the present disclosure. FIG. 4 is a flowchart illustrating an operation sequence of a device for detecting a person in distress at a site of a collapse disaster according to an embodiment of the present disclosure.

The device for detecting a person in distress at a site of a collapse disaster according to the embodiment of the present disclosure may include a ground drone 10, a camera device 40, storage 50, and multiple repeater modules 60. The device for detecting a person in distress at a site of a collapse disaster may further include a flying drone 32, according to embodiments of the present disclosure.

The ground drone 10 may be deployed to a site of a collapse disaster and may travel by driving a track device 20. It is equipped with a communication device 80 and a first beacon. Also, the ground drone 10 may be equipped with a high-capacity battery and an internal combustion engine, and may operate a generator with power generated by the internal combustion engine to charge the high-capacity battery. Alternatively, the high-capacity battery may be pre-charged by an external power source.

As shown in FIG. 2, the track device 20 may have a drive wheel 21, a tension wheel 22, and multiple idle wheels 23, and rubber pads 24, which may be arranged around the drive wheel 21, the tension wheel 22, and the multiple idle wheels 23.

The drive wheel 21 may be connected with an electric motor. When the electric motor is operated, the rubber pads 24 may be driven, which will eventually cause the ground drone 10 to move because the rubber pads 24 are in contact with the ground.

Further, the track devices 20 may be disposed on both sides of the ground drone 10. When the track devices 20 on both sides are driven in the same direction, the ground drone 10 may move forward or backward.

When the track devices 20 on both sides rotate in different directions or at different rotation speeds, the ground drone 10 may turn around.

A remote operator may control the manipulator to drive the ground drone 10 forward, backward, to the left, or to the right.

The track device 20 may have a height h from the ground to the drive wheels 21 or tension wheels 22 ranging from 20 centimeters to 30 centimeters, and an angle of entry a ranging from 35 degrees to 55 degrees, and thus may be capable of climbing common stairs that humans walk up and down.

Furthermore, as the drive wheel 21 is disposed at a certain height h from the ground, safety may be secured to ensure that the drive motor is not directly damaged even if the ground drone 10 collides with an obstacle while traveling.

The tension wheel 22 maintains the tension of the rubber pad 24, thereby exerting a force that pushes the rubber pad 24 outward.

The idle wheels 23 may absorb shocks transmitted from the ground, and may roll along a track formed on the inner surface of the rubber pads 24.

A drone station 30 may be installed on the top surface of the ground drone 10. The flying drone 32 may be mounted on the drone station 30. The flying drone 32 may be fixed to the drone station 30 while the ground drone 10 is moving.

Further, the flying drone 32 may have a charged battery, but may be charged at the drone station 30 when the residual voltage is low while mounted on the ground drone 10. Electrical contacts may be formed on the legs of the flying drone 32, and electrical contacts may also be formed on the drone station 30, such that the electric al contacts on both sides may contact each other to charge the flying drone 32 from the ground drone 10.

The drone station 30 may hold a portion of the legs of the flying drone 32, thereby allowing the flying drone 32 to stand without falling to the ground even if the ground drone 10 is somewhat shaken during travel.

The technique for holding the legs of the flying drone 32 at the drone station 30 may employ electromagnets, and may operate an actuator such as a solenoid to set the locked mode. These techniques are known in the art and will not be described in detail.

As shown in FIGS. 1 and 2, multiple flying drones 32 may be provided, each with a unique identification code.

Additionally, the flying drone 32 may be equipped with a camera to capture general video and a thermal imaging camera to detect heat. Thus, the flying drone 32 may be flown to photograph the surroundings of the collapse disaster site. In particular, by using the thermal imaging camera, the temperature difference between the human body and the surrounding objects may be clearly distinguished, and the image may be analyzed to determine the presence of a person.

In addition, the flying drone 32 may pre-check the route to be traveled by the ground drone 10 and may contribute to ensuring that the rescue team secures a clear path to travel.

That is, the flying drone 32 may be carried on the ground drone 10, and may fly or return in response to an operation signal from a rescuer. Also, it may photograph the site of the collapse disaster.

The camera device 40 may be mounted on the ground drone 10 to photograph the surroundings on the front, rear, left and right sides of the ground drone 10 and above the ground drone 10.

In other words, the camera device 40 may focus its shooting view on lower altitudes that cannot be captured by the flying drone 32, thereby obtaining a video of the view that is more vivid and most similar to the view of the rescuers.

The camera device 40 may take images in all directions, such as the front, rear, left, right, and upward directions of the ground drone, and the images taken in all directions may be synthesized and utilized as data images to realize a three-dimensional image, thereby allowing the rescue team to substantially understand the site situation before entering the site of the collapse disaster and to secure a safe movement path for the rescue team.

The storage 50 may be installed on the ground drone 10 as shown in FIGS. 1 and 2. The storage 50 may accommodate the repeater module 60, and the repeater module 60 may be thrown to the site of the collapse disaster according to an operation signal.

In other words, the repeater modules 60 do not fall apart randomly while the ground drone 10 is traveling, and a more stable wireless communication network may be established by throwing the repeater modules 60 in a specific area according to the will of the rescue team.

The multiple repeater modules 60 are connected by the wireless communication network to relay wireless communication between the ground drone 10, the flying drone 32, and the command and control unit 100.

The repeater module 60 may further include a second beacon.

In the wireless communication network, each communication terminal may be assigned a unique identification number (IP) to determine what data to send and receive, and the unique identification number (IP) may be assigned automatically.

Further, the repeater modules 60 may be carried in a sleep mode and may be switched to a use mode just prior to being thrown, thereby minimizing power consumption in the repeater modules 60 such that they may substantially consume power when the wireless communication network is activated.

According to an embodiment of the present disclosure, the device for detecting a person in distress at a site of a collapse disaster may assign a unique identification number (IP) to the multiple repeater modules 60 in advance in a normal situation other than a disaster situation, and perform wireless authentication in advance, such that the wireless communication network may be stabilized in a situation of a collapse disaster.

The device for detecting a person in distress at a site of a collapse disaster according to the embodiment of the present disclosure described above may carry the repeater modules 60, may throw the repeater modules 60 when arriving at a shaded area where communication is not smooth, and may establish a wireless communication network using the repeater modules 60 thrown in various places.

In particular, the embodiment of the present disclosure may allow a wireless communication network to be established at the site of a collapse disaster when the connection to the disaster safety communication network and the commercial communication network is not smooth, thereby enabling more accurate acquisition and sharing of on-site situation information and contributing to the establishment and implementation of rescue plans in a safer manner.

Furthermore, the device for detecting a person in distress at a site of a collapse disaster according to the embodiment of the present disclosure may be used to carry various kinds of electrical and electronic equipment, such as, for example, the flying drone 32 and the repeater module 60, to a disaster site, and then launch the flying drone 32 at an appropriate point or throw the repeater module 60 and cause the repeater module 60 to operate, such that the power of the various kinds of electrical and electronic equipment is not wasted and can be used at an appropriate time to actually operate the various kinds of electrical and electronic equipment, thereby increasing the efficiency of equipment use.

According to an embodiment of the present disclosure, the device for detecting a person in distress at a site of a collapse disaster may transmit image data collected by the camera device 40 and image data collected by the flying drone 32 to the command and control unit 100 in real time over the wireless communication network.

Further, the wireless communication network may be configured to perform two-way communication, such that control signals for controlling the ground drone 10 and the flying drone 32 may be transmitted from the command and control unit 100 in real time.

Thus, the device for detecting a person in distress at a site of a collapse disaster according to the embodiments of the present disclosure may more reliably identify whether there are people in need of help and, if so, where they are located, and what situation they are in.

The camera device 40 may include a thermal imaging camera 42, a video camera 44, and a light 45.

The thermal imaging camera 42 may measure the temperature of a subject. Thereby, the difference between the temperature of the human body and the temperature of the surrounding objects may be revealed in the video image, and therefore the location of a person in need of help may be known.

In addition, the imaging camera 44 takes regular images, which may be combined with the image from the thermal imaging camera to provide a clearer visual identification of the object.

The light 45 shines light on the object, thereby improving the image quality.

In other words, the rescue team may enter the disaster site with a more sophisticated understanding of where help is needed, whether the path to get there is free of hazards, etc. based on a synthesized image that combines image data from the thermal imaging camera 42 and image data from the general imaging camera 44.

The storage 50 will be described in more detail with reference to FIG. 1. The storage 50 may accommodate the repeater modules 60, and may eject the repeater modules 60 at an appropriate time.

The storage 50 may include a screw conveyor 52 and a drain guide 54.

The screw conveyor 52 may be configured as a wire spiral, and the repeater module 60 may be disposed in the spaces provided in the troughs, respectively. As shown in FIG. 2, the screw conveyor 52 may be disposed on the upper side of the repeater modules 60 to prevent the repeater modules 60 from being accidentally dislodged in unplanned or unintended areas, even if the ground drone 10 is excessively shaken during travel.

The screw conveyor 52 may rotate the spiral-shaped body by the operation of the drive motor, such that the repeater modules 60 may be moved to one side along the spiral by the spiral motion. The direction of movement may be divided into a throwing direction and a storing direction.

That is, when the screw conveyor 52 is operated in the storing direction, the repeater modules 60 are stored. When the screw conveyor 52 is operated in the throwing direction, the repeater modules 60 are discharged toward the drain guide 54.

The drain guide 54 may be disposed on one side of the screw conveyor 52, as shown in FIG. 1, and may extend inclined toward the ground so as to lower the impact energy applied to the repeater modules 60 falling off the screw conveyor 52 and hitting the ground.

As described above, for the device for detecting a person in distress at a site of a collapse disaster according to the embodiment of the present disclosure, the ground drone 10 may carry multiple repeater modules 60. When the ground drone 10 arrives at a point where the repeater modules 60 are to be installed, the storage 50 may operate the screw conveyor 52 to discharge one repeater module 60 and move to another place.

When there is a point where a repeater module 60 is to be installed in another place, the ground drone 10 discharges another repeater module 60.

In other words, even if things are chaotic at the site of the collapse disaster, the repeater modules 60 may be deployed at an appropriate distance from each other or by finding points where radio interference is minimized, thereby making the wireless communication network more complete.

According to an embodiment of the present disclosure, the device for detecting a person in distress at a site of a collapse disaster may further include a sensing device 70.

The sensing device 70 may be installed on one side of the ground drone 10, and may collect human breathing sounds, voices, cell phone sounds, and man-made rhythmic sounds. These sounds may be stored as voice data and transmitted to the command and control unit 100.

In other words, sounds that cannot occur in nature and can only be heard in the presence of a human are identified, and this process may be accomplished using artificial intelligence (AI).

The AI may identify sounds that can occur in the presence of a human, such as human breathing sounds, voices, cell phone sounds, and man-made rhythmic sounds, and determine them to be vital signs.

The first and second beacons may utilize beacon technology, such that when a particular terminal recognizes the first beacon or the second beacon, it may indicate on the terminal the presence of the first and second beacons in the vicinity of the terminal.

For example, the ground drone 10 or one of the multiple repeater modules 60 may send significant evidence of a vital sign, but the rescuer team may not know which device the evidence came from or where that device is located. With the first and second beacons, the rescue team may more easily and quickly reach the location of the person in distress.

Hereinafter, with reference to FIGS. 3 and 4, the function and effect of the device for detecting a person in distress at a site of a collapse disaster according to the embodiments of the present disclosure will be described.

First step (S1): The ground drone 10 enters a site of a collapse disaster and moves to a communication shaded area as shown in FIG. 3.

While FIG. 3 illustrates that there is a ground drone 10 per floor, this is merely for understanding of the technology, and one or two ground drones 10 may move around the inside of the collapsed man-made structure.

A larger number of repeater modules 60 may be thrown if it is estimated that the reach of the radio waves will be insufficient due to the large area of a floor, or if it is estimated that the radio waves will be interfered with due to the presence of obstacles.

The multiple thrown repeater modules 60 establish a wireless communication network, and the command and control unit 100 can recognize where each of the repeater modules 60 was thrown. Therefore, the rescue team may map out a path of movement with reference to the locations where the repeater modules 6 were thrown.

Second step (S2): Among the devices mounted on the ground drone 10, any device that generates noise may be stopped from functioning. For example, the electric motor for driving the track device 20, the flying drone 32, and the like may be stopped from functioning to suppress noise generation.

Third step (S3): Transmitting and stopping transmitting the rescue announcement message may be repeated at regular time intervals. By transmitting the rescue announcement message, relief and comfort may be provided to a person who needs help, thereby preventing the distressed person's psychological situation from deteriorating. In particular, by minimizing unnecessary noise and clutter in the surroundings, vital sounds may be collected reliably.

Fourth step (S4): When the rescue announcement voice transmission is stopped, voice data may be input or image data may be input.

The voice data may be collected through a microphone installed on the ground drone 10.

The image data may be collected through the camera device 40.

The flying drone 32 may be disabled during the fourth step S4, but may be flown at the will of the command and control unit 100 to capture images of the surroundings.

In addition, a communication repeater may be installed on the flying drone 32, which may relay wireless communications in the air when wireless communications via the repeater modules 60 disposed on the ground are unavailable, and may dramatically reduce wireless communication shaded areas.

Fifth step (S5): The collected voice data and the collected image data may be transmitted to the command and control center 100 over the wireless communication network.

Also, the command and control unit 100 may transmit control signals for controlling the respective pieces of equipment over the wireless communication network, which may cause the ground drone 10 to move, or may cause a repeater module 60 to be thrown in a particular area, and may cause the ground drone 10 to move closer to the location where the distressed person is believed to be present.

Sixth step (S6): From the input voice data, one of a human breathing sound, a voice, or a cell phone sound is analyzed and determined to be a vital sign. As described above, there is a distinction between sounds that can occur in the absence of a person and sounds that can be heard only when a person is present.

The sounds that can be heard only when a person is present may include human breathing sounds, voices, and sounds related to touching a mobile device. When it is determined that such sounds are heard, it may be determined that there is a person in distress near the place where the sound is input, and the reliability of the determination may be increased.

In the fourth step above, the rescue announcement voice may include requesting a specific rhythmic sound.

The specific rhythmic sound may be a simple rhythm that is familiar to everyone, and the distressed person may tap on an object, such as a wall or floor, or mimic the sound with their mouth.

Familiar rhythms may include, for example, '3-3-7' claps, "dae, han, min, kuk clapping-clapping-clapping clapping-clapping" introduced in the 2002 World Cup, and the rhythms of traditional folk songs. They may be encouraged to create a simple rhythm that is easy to follow, even if they are unfamiliar to the rhythm.

In this way, even if the person in distress does not have a cell phone, or the cell phone is dead and it is difficult to make a sound, the person in distress can use objects around him or her to more clearly indicate his or her location.

In other words, the device for detecting a person in distress at a site of a collapse disaster according to an embodiment of the present disclosure may analyze whether a specific rhythmic sound is contained in the voice data collected in the sixth step, and determine that a man-made rhythmic sound contained in the voice data is a vital sign, thereby significantly increasing the reliability of the determination result.

Seventh step (S7): When the rescue team enters the site of the collapse disaster and approaches the ground drone 10 or the repeater module 60 that has submitted the basis for determining the vital sign, the first beacon or the second beacon recognizes the terminal carried by the rescue team, and causes the terminal to indicate that the ground drone 10 or the repeater module 60 is nearby.

Thus, the time and distance traveled by the rescue team to find the person in distress may be greatly reduced, and the person in distress may be located and rescued more quickly.

Although embodiments of the present disclosure have been described with reference to the accompanying drawings, it will be understood by those skilled in the art to which the present disclosure pertains that the present disclosure can be practiced in other specific forms without altering its technical ideas or essential features.

Accordingly, the embodiments described above are to be understood as exemplary and non-limiting in all respects, and the scope of the present disclosure is indicated by the appended claims. All modifications or variations derived from the meaning and scope of the claims and their equivalents are to be construed as being within the scope of the present disclosure.

INDUSTRIAL APPLICABILITY

The device according to an embodiment of the present disclosure may be used to search for a person in distress at a site of a collapse disaster.

What is claimed is:

1. A buried person search device using a detachable module, the device comprising:
    a ground drone deployed at a site of a collapse disaster to travel by driving a track device, the ground drone having a communication device and a first beacon mounted thereon;
    a camera device mounted on the ground drone to photograph surroundings on front, rear, left and right sides of the ground drone and above the ground drone;
    a storage installed on the ground drone;
    a plurality of repeater modules connected by a wireless communication network to relay wireless communications between the ground drone, a flying drone, and a command and control center, each of the repeater modules having a second beacon; and
    a sensing device installed on the ground drone or the repeater modules to collect a human breathing sound, a voice, a cell phone sound, and a man-made rhythmic sound,
    wherein the storage accommodates the repeater modules, and throws the repeater modules to the site of the collapse disaster in response to an operation signal,
    wherein the buried person search device is configured to:
    control the ground drone to move to a communication shaded area at the site of a collapse disaster and deploy the repeater modules to establish a wireless communication network;
    control all noise-generating devices among the devices mounted on the ground drone to stop their functions;
    repeat transmitting and stopping of transmission of a rescue announcement voice at regular time intervals;
    receive input voice data or image data when the transmission of the rescue announcement voice is stopped;
    communicate the collected voice data and collected image data and control signals for controlling the respective devices over the wireless communication network;
    analyze one of a human breathing sound, a voice, and a mobile terminal sound from the input voice data and determining a vital sign; and
    when a rescue team enters the site of the collapse disaster and approaches the ground drone or the repeater module that has sent a basis for determining a vital sign, recognize, by a first beacon or a second beacon, a terminal carried by the rescue team, and cause the terminal to indicate presence of the ground drone or a repeater module near the rescue team.

2. The device of claim 1, wherein image data collected by the camera device and image data collected by the flying drone are transmitted in real time to the command and control unit over the wireless communication network,
    wherein control signals to control the ground drone and the flying drone are transmitted in real time from the command and control unit.

3. The device of claim 1, wherein the camera device comprises:
    a thermal imaging camera configured to measure a temperature of a subject;
    a imaging camera configured to capture a general image; and
    a light configured to emit light to enhance image quality.

4. The device of claim 1, wherein the storage comprises:
    a screw conveyor configured in a helical shape to accommodate the repeater modules in spaces provided in troughs of the screw conveyor; and
    a drain guide disposed on one side of that screw conveyor and extending inclined towards ground so as to lower an impact energy against the ground when any one of the repeater modules falling out of the screw conveyor hits the ground.

5. The device of claim 1, wherein, when a rescue team approaches within a communication distance range, the first beacon or the second beacon recognizes a terminal carried by the rescue team and causes the terminal to indicate presence of the ground drone or the repeater modules near the rescue team.

6. The device of claim 2, wherein the camera device comprises:
    a thermal imaging camera configured to measure a temperature of a subject;
    a imaging camera configured to capture a general image; and
    a light configured to emit light to enhance image quality.

7. A method for operating a device for detecting a person in distress at a site of a collapse disaster, the method comprising:
    a first step of introducing a ground drone to the site of the collapse disaster, moving the ground drone to a communication shaded area and establishing a wireless communication network by throwing a repeater module;
    a second step of stopping all devices generating noise from functioning among devices mounted on the ground drone;
    a third step of repeating transmitting and stopping of transmission of a rescue announcement voice at regular time intervals;
    a fourth step of receiving input voice data or image data when the transmission of the rescue announcement voice is stopped;
    a fifth step of communicating collected voice data and collected image data and control signals for controlling the respective devices over the wireless communication network;
    a sixth step of analyzing one of a human breathing sound, a voice, and a mobile terminal sound from the input voice data and determining a vital sign; and
    a seventh step of, when a rescue team enters the site of the collapse disaster and approaches the ground drone or the repeater module that has sent a basis for determining a vital sign, recognizing, by a first beacon or a second beacon, a terminal carried by the rescue team, and causing the terminal to indicate presence of the ground drone or a repeater module near the rescue team.

8. The method of claim 7, wherein the fourth step comprises requesting a specific rhythmic sound in the rescue announcement voice,
    wherein the sixth step comprises:
    determining whether the specific rhythmic sound is contained in the collected voice data by analyzing the collected voice data; and when the specific rhythmic sound is contained in the collected voice data, determining the rhythmic sound to be the vital sign.

* * * * *